United States Patent
Santos et al.

(10) Patent No.: US 11,563,648 B2
(45) Date of Patent: Jan. 24, 2023

(54) VIRTUAL NETWORK FUNCTION PLACEMENT IN A CLOUD ENVIRONMENT BASED ON HISTORICAL PLACEMENT DECISIONS AND CORRESPONDING PERFORMANCE INDICATORS

(71) Applicant: Telefonaktiebolaget LM Ericsson (publ), Stockholm (SE)

(72) Inventors: Mateus Augusto Silva Santos, Sao Paulo (BR); Amadeu Do Nascimento Junior, Indaiatuba (BR); Pedro Henrique Gomes Da Silva, Sao Paulo (BR); Allan Vidal, Indaiatuba (BR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/438,706

(22) PCT Filed: Feb. 25, 2019

(86) PCT No.: PCT/EP2019/054584
§ 371 (c)(1),
(2) Date: Sep. 13, 2021

(87) PCT Pub. No.: WO2020/173541
PCT Pub. Date: Sep. 3, 2020

(65) Prior Publication Data
US 2022/0158910 A1    May 19, 2022

(51) Int. Cl.
*G06F 15/173* (2006.01)
*H04L 41/5009* (2022.01)
(Continued)

(52) U.S. Cl.
CPC ...... *H04L 41/5009* (2013.01); *H04L 41/0806* (2013.01); *H04L 41/12* (2013.01); *H04L 41/145* (2013.01); *H04L 41/147* (2013.01)

(58) Field of Classification Search
CPC . H04L 41/5009; H04L 41/0806; H04L 41/12; H04L 41/145; H04L 41/147
See application file for complete search history.

(56) References Cited

U.S. PATENT DOCUMENTS 10,091,070 B2   10/2018 Chopra et al.
10,749,796 B2 *  8/2020 Dowlatkhah ......... H04W 40/04
(Continued)

FOREIGN PATENT DOCUMENTS

EP       3343368 A1    7/2018
WO    2018033878 A1    2/2018

OTHER PUBLICATIONS

International Search Report and Written Opinion dated Oct. 24, 2019 for International Application No. PCT/EP2019/054584 filed Feb. 25, 2019, consisting of 9-pages.

*Primary Examiner* — Wing F Chan
*Assistant Examiner* — Joseph R Maniwang
(74) *Attorney, Agent, or Firm* — Christopher & Weisberg, P.A.

(57) ABSTRACT

A method for placing a virtual network function (VNF) in a datacenter system based on historical data. The method includes receiving, by a placement service from a client device, a VNF placement request that includes an identifier of the VNF, wherein the VNF placement request requests placement of an instantiation of the VNF with a node in a set of candidate nodes of the datacenter system; calculating, by the placement service, a set of similarity values between the set of candidate nodes of the datacenter system and the historical data, wherein the historical data represents previous placements of the VNF in the datacenter system, including performance indicators associated with these placements; and determining, by the placement service, a placement node from the set of candidate nodes for placing (Continued)

the instantiation of the VNF based on the set of similarity values.

20 Claims, 9 Drawing Sheets

(51) Int. Cl.
*H04L 41/0806* (2022.01)
*H04L 41/12* (2022.01)
*H04L 41/14* (2022.01)
*H04L 41/147* (2022.01)

(56) References Cited

U.S. PATENT DOCUMENTS

2017/0019302 A1 1/2017 Lapiotis et al.
2017/0318097 A1* 11/2017 Drew .................. H04L 67/2833
2018/0121222 A1 5/2018 Sharma et al.
2018/0124254 A1 5/2018 Shaw et al.

* cited by examiner

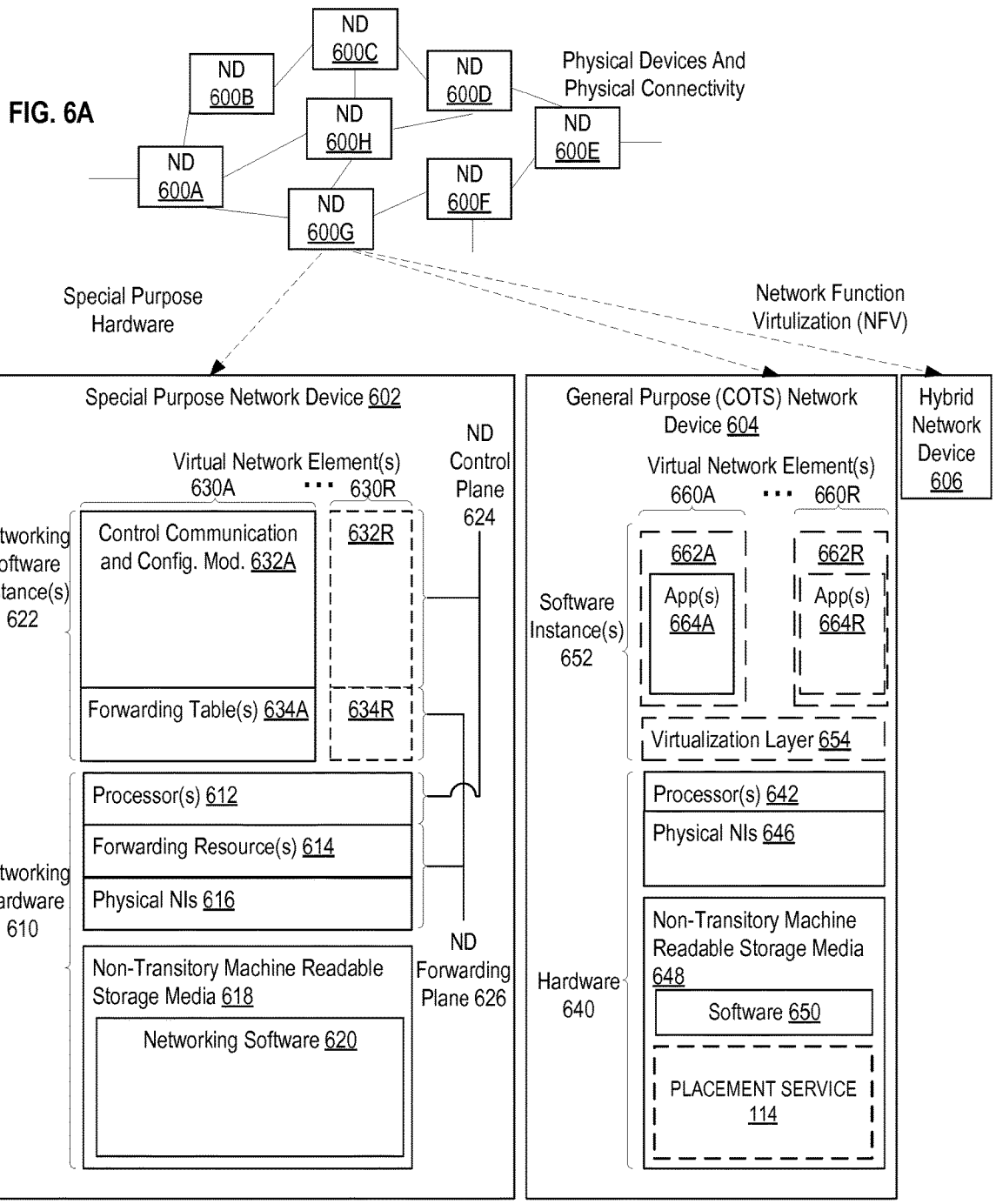

VIRTUAL NETWORK FUNCTION PLACEMENT IN A CLOUD ENVIRONMENT BASED ON HISTORICAL PLACEMENT DECISIONS AND CORRESPONDING PERFORMANCE INDICATORS

CROSS-REFERENCE TO RELATED APPLICATION

This application is a Submission Under 35 U.S.C. § 371 for U.S. National Stage Patent Application of International Application Number: PCT/EP2019/054584, filed Feb. 25, 2019 entitled "VIRTUAL NETWORK FUNCTION PLACEMENT IN A CLOUD ENVIRONMENT BASED ON HISTORICAL PLACEMENT DECISIONS AND CORRESPONDING PERFORMANCE INDICATORS," the entirety of which is incorporated herein by reference.

TECHNICAL FIELD

Embodiments of the invention relate to the field of datacenter management; and more specifically, to virtual network function (VNF) placement in a cloud environment based on historical placement decisions and corresponding performance indicators.

BACKGROUND ART

In a distributed cloud environment, featuring edge and centralized computing, network and compute nodes become candidates for hosting virtual network functions (VNFs), network services, and applications. Such nodes are deployed in cloud sites which are typically geographically distributed and interconnected through a wide area network (WAN). The large size of the network and cloud infrastructure requires efficient algorithms and solutions for orchestration or placement of VNF instantiation requests. The reason for seeking efficiency in placement is that there may be placement constraints, related to infrastructure capabilities, such as, but not limited to, compute node capacity (e.g., processing, memory, and storage capacity) and link latency and/or throughput. Therefore, quickly arriving at a placement decision is essential for provisioning new services in networks in an expedient manner. However, placement decisions are often inaccurate when solely based on current infrastructure information as these predictions fail to take into account actual performance on a corresponding node.

SUMMARY

A method is described for placing a virtual network function (VNF) in a datacenter system based on historical data. The method includes receiving, by a placement service from a client device, a VNF placement request that includes an identifier of the VNF, wherein the VNF placement request requests placement of an instantiation of the VNF with a node in a set of candidate nodes of the datacenter system; calculating, by the placement service, a set of similarity values between the set of candidate nodes of the datacenter system and the historical data, wherein the historical data represents previous placements of the VNF in the datacenter system, including performance indicators associated with these placements; and determining, by the placement service, a placement node from the set of candidate nodes for placing the instantiation of the VNF based on the set of similarity values.

A non-transitory machine-readable storage medium is described that provides instructions that, if executed by a processor of a placement service in a datacenter system, will cause said processor to perform operations. The operations include receiving, from a client device, a VNF placement request that includes an identifier of the VNF, wherein the VNF placement request requests placement of an instantiation of the VNF with a node in a set of candidate nodes of the datacenter system; calculating a set of similarity values between the set of candidate nodes of the datacenter system and historical data, wherein the historical data represents previous placements of the VNF in the datacenter system, including performance indicators associated with these placements; and determining a placement node from the set of candidate nodes for placing the instantiation of the VNF based on the set of similarity values.

A system is described for placement of a virtual network function (VNF) in a distributed datacenter. The system includes a memory unit that stores instructions and a processor coupled to the memory unit to execute the instructions. The instructions to cause the system to receive, from a client device, a VNF placement request that includes an identifier of the VNF, wherein the VNF placement request requests placement of an instantiation of the VNF with a node in a set of candidate nodes of the datacenter system; calculate a set of similarity values between the set of candidate nodes of the datacenter system and historical data, wherein the historical data represents previous placements of the VNF in the datacenter system, including performance indicators associated with these placements; and determine a placement node from the set of candidate nodes for placing the instantiation of the VNF based on the set of similarity values.

As described, the placement decision for a VNF placement request is based on historical data of previous VNF placements. The benefits of placement recommendations based on historical data include simplification and efficiency of placement decisions since nodes with better ratings will be prioritized, resulting in a reduced number of nodes as effective candidates for the placement. Further, problems detected in past placement decisions are avoided for subsequent placement decisions (e.g., previous placements that generated performance degradation can be identified with machine learning based schemes, such as anomaly detection). Additionally, by using historical data for automated placement decisions, VNF constraints/descriptors are no longer the only input, such that the placement services can provide the most relevant nodes for the placement based on previous decisions. This consequently provides the benefit of decreasing the dependency on resource descriptors for placement since historical data is used while traditional optimization-based solutions will always need service requirements/descriptors as inputs. As a result, the roles of models (e.g., VNF descriptors or network service descriptors (NSDs)) in placement are less important since service parameters and requirements can be inferred from the historical data. The technical effect is that, when a VNF placement is requested, historical data will be used to obtain or infer the actual VNF requirements/descriptors. Thus, the capacities declared in the VNF descriptors that are provided in the VNF placement request will not be used, while providing a more accurate placement solution.

BRIEF DESCRIPTION OF THE DRAWINGS

The invention may best be understood by referring to the following description and accompanying drawings that are used to illustrate embodiments of the invention. In the drawings:

FIG. 6A illustrates connectivity between network devices (NDs) within an exemplary network, as well as three exemplary implementations of the NDs, according to some embodiments of the invention.

FIG. 6B illustrates an exemplary way to implement a special-purpose network device according to some embodiments of the invention.

DETAILED DESCRIPTION

The following description describes methods and apparatus for virtual network function (VNF) placement in a cloud environment based on historical placement decisions and corresponding performance indicators. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
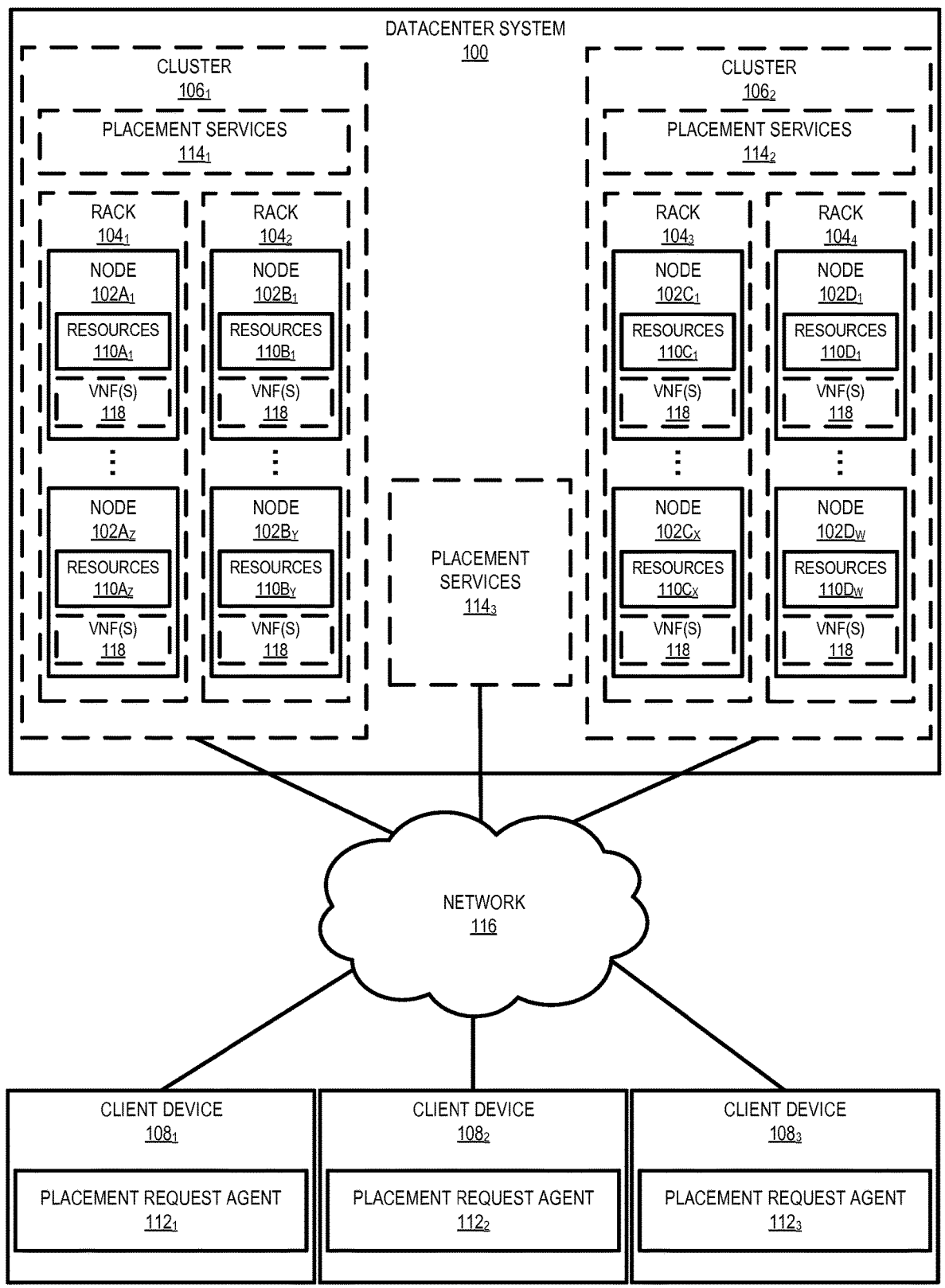
FIG. 1 shows a datacenter system for distributed resource management in cloud infrastructures through the use of historical placement information, according to one example embodiment.

FIG. 1 shows a datacenter system 100 for distributed resource management in cloud infrastructures through the use of historical placement information, according to one example embodiment. As shown in FIG. 1, the datacenter system 100 includes sets of nodes 102 (e.g., network and compute nodes) that may be statically arranged into particular configurations. For example, a first set of nodes $102A_1$-$102A_Z$ may be arranged in a first rack $104_1$, a second set of nodes $102B_1$-$102B_Y$ may be arranged in a second rack $104_2$, a third set of nodes $102C_1$-$102C_X$ may be arranged in a third rack $104_3$, and a fourth set of nodes $102D_1$-$102D_W$ may be arranged in a fourth rack $104_4$. As used herein, a rack 104 (sometimes referred to as a server rack 104) is an equipment structure that is designed to hold multiple servers in associated bays of the rack 104.

The racks 104 may be further grouped into clusters 106 (e.g., the racks $104_1$ and $104_2$ are grouped into a first cluster $106_1$ while the racks $104_3$ and $104_4$ are grouped into a second cluster $106_2$). The organization/grouping of nodes 102 into racks 104 and clusters 106 may correspond to physical proximity of the nodes 102. For example, all nodes 102 in the same cluster 106 may be installed in the same building/location. For instance, each of the nodes 102 within a cluster 106 are communicatively coupled together in a single physical/geographical location. Accordingly, the nodes $102A_1$-$102A_Z$ and $102B_1$-$102B_Y$ in the first cluster $106_1$ are at a first geographical location, while the nodes $102C_1$-$102C_X$ and $102D_1$-$102D_W$ in the second cluster $106_2$ are at a second location. As a result, the datacenter system 100 may be a distributed architecture in which sets of nodes 102 and/or a set of clusters 106 represent separate, distributed datacenters in the datacenter system 100. This physical arrangement of nodes 102 is static and cannot be easily manipulated/altered, and particularly cannot be easily or quickly manipulated/altered to meet demands of processes or functions. In some embodiments, each datacenter in the datacenter system 100 may be owned and/or operated by separate service providers and/or operators. As will be described below, functions and/or services may be placed/assigned to separate nodes 102 based on various factors. In some embodiments, the placement of functions and/or services may result in a function/service being moved from one node 102 at a first geographical location (i.e., a first datacenter) to another node at a second geographical location (i.e., a second datacenter). Accordingly, although nodes 102, clusters 106, and corresponding datacenters of the datacenter system 100 may be geographically distributed, functions and services may be moved seamlessly within the datacenter system 100.

Although shown with two sets of clusters 106 that each include two racks 104 of nodes 102, in other embodiments, the number of clusters 106, racks 104, and nodes 102 in the datacenter system 100 may be different. In some cases, one or more clusters 106, racks 104, and/or nodes 102 may be added to or removed from the datacenter system 100 periodically during normal operation of the datacenter system 100. Accordingly, the configuration of the datacenter system 100 shown in FIG. 1 is for illustrative purposes.

A node 102, as used herein, is an electronic device that provides resources 110 for processing one or more virtual network functions (VNFs) 118 in a client-server model. For example, the node $102A_1$ may include the resources $110A_1$, the node $102A_Z$ may include the resources $110A_Z$, the node $102B_1$ may include the resources $110B_1$, the node $102B_Y$ may include the resources $110B_Y$, the node $102C_1$ may include the resources $110C_1$, the node $102C_X$ may include the resources $110C_X$, the node $102D_1$ may include the resources $110D_1$, and the node $102D_W$ may include the resources $110D_W$. The resources 110 provided by each of the nodes 102 may include items to support processing/execution of the VNFs 118, such as physical or logical processors and/or cores and memory. For example, the client devices $108_1$-$108_3$ may each be associated with one or more VNFs 118, which each require a set of resources 110 for processing/execution. The VNFs 118 are computer software that may be instantiated into separate instances and are each designed to perform a group of coordinated functions, tasks, or activities and may be part of a larger service and/or application for associated client devices $108_1$-$108_3$. The VNFs 118 may be managed or otherwise monitored by respective placement request agents $112_1$-$112_3$ that ensure a set of resources 110 is allocated/reserved for processing/execution of their respective VNFs 118. Each of the client devices $108_1$-$108_3$ may be coupled to the datacenter system 100 via the network 116 such that the placement request agents $112_1$-$112_3$ may request the datacenter system 100 reserve/allocate a set of resources 110 for processing/execution of their respective VNFs 118 based on historical placement information/data (sometimes referred to herein as "historical data").

In particular, the datacenter system 100 may include a set of placement services $114_1$-$114_3$ that manage placement decisions in the datacenter system 100 based on historical placement information. As shown, the placement services 114 may be collocated with sets of nodes 102 (e.g., a placement service 114 may be assigned for each of the clusters $106_1$ and $106_2$ (i.e., the placement services $114_1$ and $114_2$, respectively) for making placement decisions for corresponding nodes 102), or a single placement service 114 may be used for making placement decisions for all nodes 102 in the datacenter system 100 (i.e., the placement service $114_3$).

The placement services 114 can periodically determine identifiers and descriptors (i.e., VNF identifiers and VNF descriptors) associated with currently placed instantiations of VNFs 118. In particular, multiple instantiations of the same VNFs 118 may be generated and placed in various nodes 102 of the datacenter system 100 (i.e., each instantiation of a VNF 118 may be located in a separate node 102 or in the same node 102 to utilize corresponding resources 110). The placement services 114 may periodically determine identifiers and descriptors associated with each currently placed VNF 118 instantiation such that infrastructure information associated with the VNF 118 instantiations can be recorded, including historical performance indicators for these VNFs 118. The identifiers indicate the different sets of VNFs 118 that are placed in the datacenter system 100 while the descriptors describe the requested resources 110 for each of the instantiated VNFs 118 (i.e., requested by the client devices 108).

The placement services 114 can additionally determine infrastructure information associated with each of the instantiated VNFs 118. For each VNF 118 instantiation, the infrastructure information can include, for example, (1) utilized resources 110 (e.g., resources 110 assigned/allocated to a VNF 118 instantiation during placement that is being utilized by the VNF 118 instantiation for execution), (2) non-utilized resources 110 (e.g., resources 110 assigned/allocated to a VNF 118 instantiation during placement that are not being utilized by the VNF 118 instantiation), (3) geographic information associated with resources 110 (e.g., a geographic location of resources 110 that have been assigned/allocated to an instantiated VNF 118), and/or (4) key performance indicators (KPIs) (sometimes referred to as "performance indicators"), which describe the processing of the instantiated VNF 118 using the assigned resources 110 (e.g., a bandwidth indication, a load indication, etc.). In particular, the KPIs describe the success or level of success of placement of a VNF 118 instantiation. For example, the KPIs may indicate one or more of (1) bandwidth of a VNF 118 instantiation (i.e., bandwidth associated with inputs and outputs from the VNF 118 instantiation), (2) latency of the VNF 118 instantiation (i.e., latency associated with outputs from the VNF 118 instantiation), (3) a memory load (i.e., an amount of memory resources, which were assigned to a VNF 118 instantiation, that were utilized), and (4) a processing load (i.e., an amount of processing resources, which were assigned to a VNF 118 instantiation, that were utilized).

Following determination, the infrastructure information can be stored in the datacenter system 100 along with corresponding identifiers and descriptors of instantiated VNFs 118, which may collectively be termed historical data. As noted above, the placement services 114 periodically determine identifiers, descriptors, and infrastructure information (i.e., historical data) for corresponding VNF 118 instantiations. Accordingly, the placement services 114 determine these pieces of information over time such that for each instantiation of a VNF 118, the placement services 114 may have recorded several sets of historical data. In some embodiments, the historical data can be filtered based on periods of time with the highest KPIs prior to storage. Accordingly, the historical data may additionally include a time component, which describes when the historical data was determined and/or stored.

Figure 2:
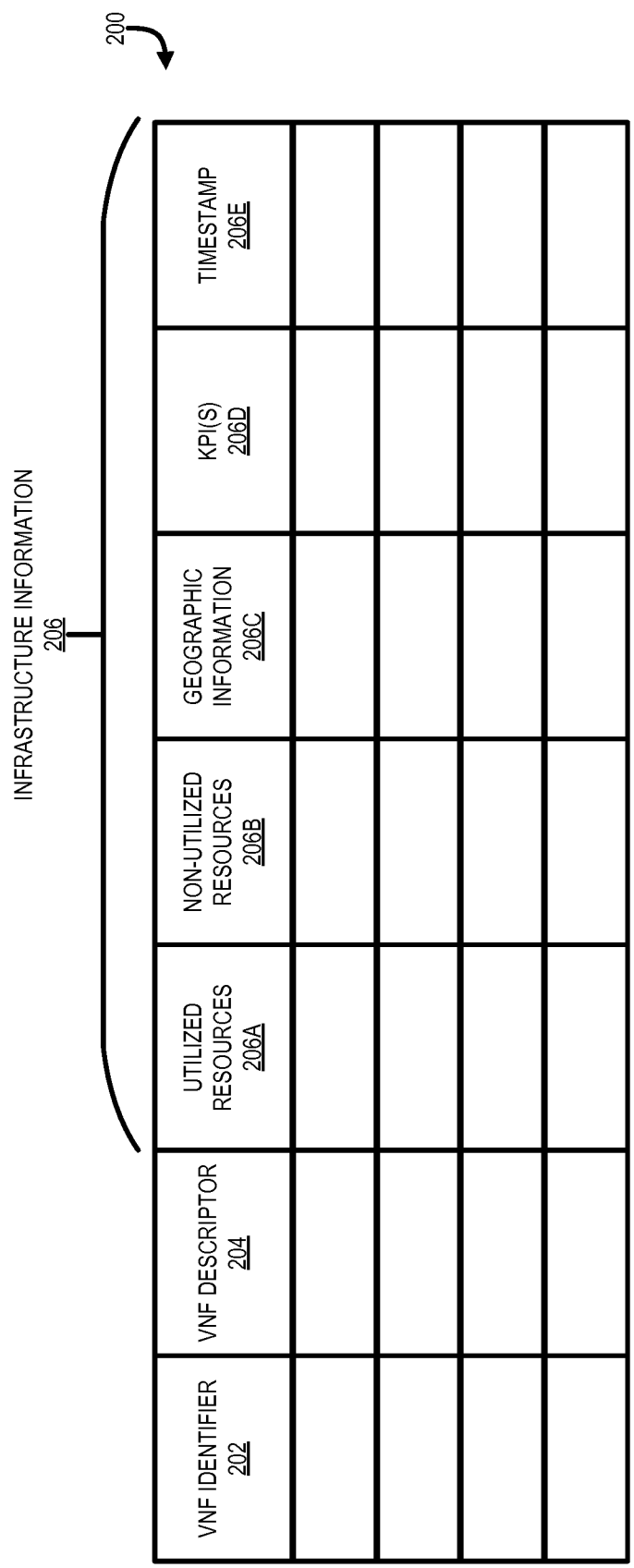
FIG. 2 shows an example table of historical data, according to one example embodiment.

FIG. 2 shows an example table of historical data 200, according to one example embodiment. As shown, the historical data 200 includes (1) a VNF identifier 202, corresponding to a VNF 118 instantiation in the datacenter system 100, (2) a VNF descriptor 204 for the VNF 118 instantiation, (3) a set of infrastructure data 206 for the VNF 118 instantiation, which may include utilized resources 206A, non-utilized resources 206B, geographic information 206C, a set of KPI(s) 206D, and a timestamp 206E corresponding to when the set of infrastructure data 206 was determined and/or stored. Values for each of the fields of the table of historical data 200 (e.g., fields 202-206) may be recorded for each VNF 118 instantiation. This historical data 200 may be used for processing placement requests, as will be described in greater detail below. Although the following will be described in relation to the historical data 200 shown in FIG. 2, in other embodiments, historical data used by the placement services 114 for processing VNF placement requests may be different than the historical data 200 shown in FIG. 2 (e.g., the historical data may include more, less, or otherwise different pieces of information than that shown in FIG. 2).

Upon receipt of a VNF placement request from a placement request agent 112 of a client device 108, which includes an identifier of a VNF 118 to be placed/instantiated in the datacenter system 100 and a VNF descriptor of the VNF 118, the placement services 114 may retrieve historical data 200 corresponding to the identifier of the VNF 118. Hereinafter, historical data for a specific VNF 118 (as specified by a VNF 118 identifier) may be alternatively described as VNF historical data. As noted above, the historical data 200 includes infrastructure information 206 describing previous execution of instantiated VNFs 118 using corresponding resources 110 of nodes 102.

In addition to historical data 200, the placement services 114 may also retrieve current infrastructure data for the datacenter system 100, which includes currently available resources 110 for a set of candidate nodes 102 (e.g., currently available processors/cores, memory, etc. of nodes 102 in the datacenter system 100). In some embodiments, the current infrastructure data can be filtered to only include nodes 102 that meet the requirements of the VNF descriptor provided in the VNF placement request. Based on the candidate nodes 102, the placement services 114 can determine a similarity between resources 110 of candidate nodes 102 described by the current infrastructure data and historical data 200 to determine similarity values for each candidate node 102 (e.g., Pearson correlation, Euclidean distance, fractional distance, Manhattan distance, cosine distance, etc.). The placement services 114 may thereafter make a placement decision for the VNF 118 of the VNF placement request based on the similarity values. For example, in one embodiment, the placement services 114 can determine norm values for the VNF 118 and node 102 pairs based on the product of the similarity value for the node 102 and a KPI value provided by the historical data 200 (e.g., a placement decision can be drawn from the maximum of the product between the similarity value and each of the historical KPI values, which gives the maximum norm value per VNF 118 and node 102 pair in which the norm value is the norm of a vector). In another embodiment, the similarity values for the candidate nodes 102 may be input into a cost function along with KPI values and one or more other input values to arrive at a placement node 102 from the candidate nodes 102 for placement of the VNF 118. This cost function can contain any parameters, including for example monetary gain/loss for fulfillment/non-fulfillment of a given KPI. In some embodiments, the cost function may consider an exploitation and exploration strategy such that the cost function can explore some placement decisions that do not fulfill the VNF descriptor constraints and therefore execute a check on the validity/value of the constraints of the VNF descriptor. Accordingly, the placement services 114 can find a successful placement using fewer resources 110 than declared in the VNF descriptor and consequently find greedy VNF descriptors that can be relaxed according to the historical data 200.

Although described in relation to VNF 118 placement, the techniques provided herein can be used in relation to placement of any type of function or tasks. For example, the techniques described herein can be applied to placement of network services, which may be composed of a set of VNFs 118, and/or placement of workloads. Accordingly, use of VNFs 118 is for purposes of illustration of the techniques described herein.

As described, the placement decision for a VNF placement request is based on the historical data 200 of previous VNF 118 placements. The benefits of placement recommendations based on historical data 200 include simplification and efficiency of placement decisions since nodes 102 with better ratings will be prioritized, resulting in a reduced number of nodes 102 as effective candidates for the placement. Further, problems detected in past placement decisions are avoided for subsequent placement decisions (e.g., previous placements that generated performance degradation can be identified with machine learning based schemes, such as anomaly detection). Additionally, by using historical data 200 for automated placement decisions, VNF 118 constraints/descriptors are no longer the only input, such that the placement services 114 can provide the most relevant nodes 102 for the placement based on previous decisions. This consequently provides the benefit of decreasing the dependency on resource descriptors for placement since historical data 200 is used while traditional optimization-based solutions will always need service requirements/descriptors as inputs. As a result, the roles of models (e.g., VNF descriptors or network service descriptors (NSDs)) in placement are less important since service parameters and requirements can be inferred from the historical data 200. The technical effect is that, when a VNF placement is requested, historical data 200 will be used to obtain or infer the actual VNF requirements/descriptors. Thus, the requirements declared in the VNF descriptors that are provided in the VNF placement request will not be used, while providing a more accurate placement solution.

Figure 3:
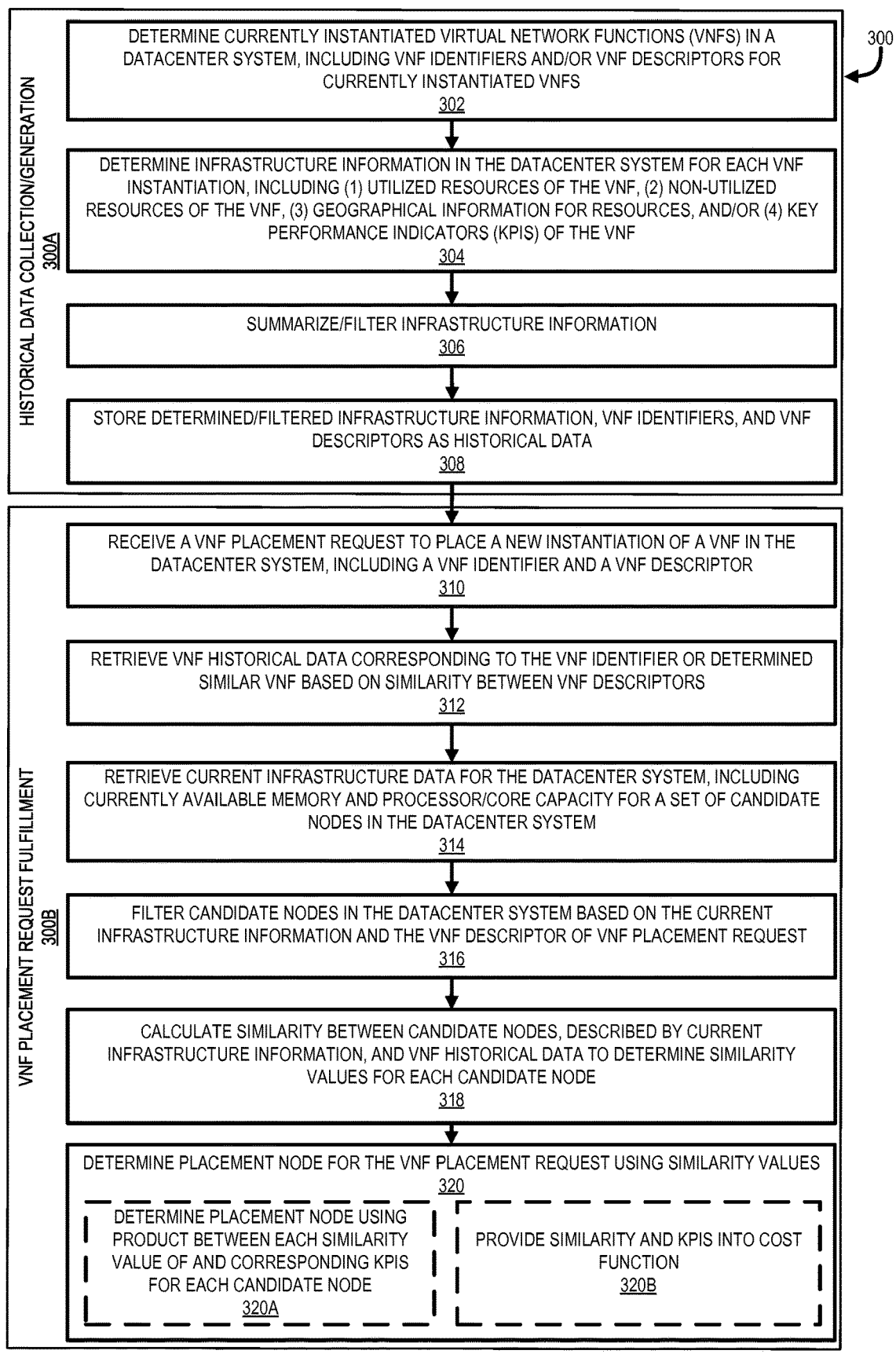
FIG. 3 illustrates a method for determining a placement decision based on historical data of previous placement decisions, according to one example embodiment.

FIG. 3 illustrates a method 300 for determining a placement decision based on historical data 200 of previous placement decisions, according to one example embodiment. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

As shown in FIG. 3, the method 300 may be split into two logical parts: historical data collection/generation 300A and VNF placement request fulfillment 300B. Each of the parts 300A and 300B may be performed independently or together, as shown. Accordingly, although VNF placement request fulfillment 300B relies on historical data 200, which could be generated based on historical data collection/generation 300A, in some embodiments, this historical data 200 may be collected/generated using a separate technique.

Figure 4:
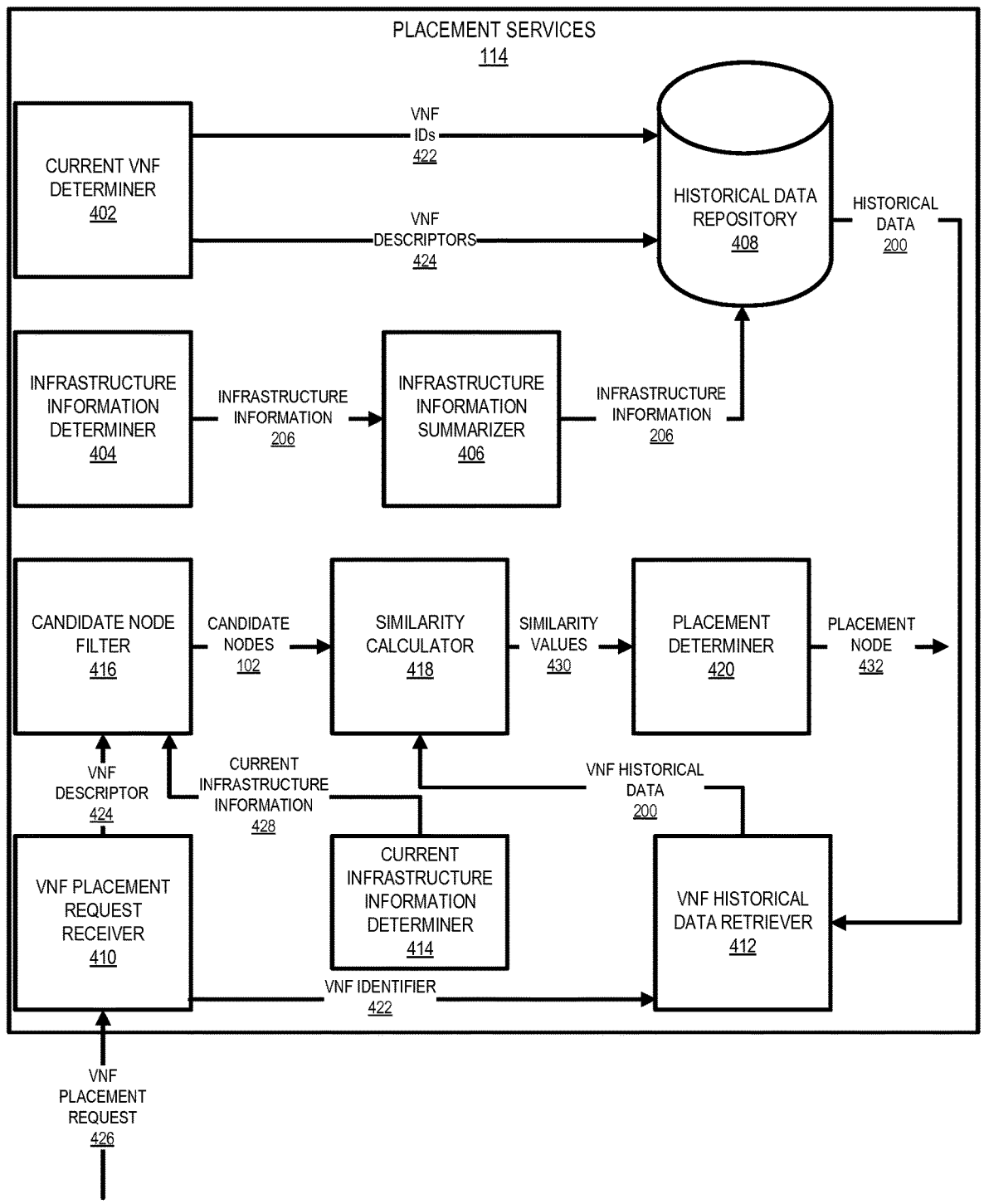
FIG. 4 shows an example component diagram of placement services, according to one embodiment.

As shown in FIG. 3, the method 300 may commence at operation 302 with the placement services 114 determining VNF identifiers and/or VNF descriptors for all currently placed VNF 118 instantiations in the datacenter system 100. In particular, each of the nodes 102 in the datacenter system 100 may be using corresponding resources 110 for processing/executing one or more VNF 118 instantiations. Each of the VNF 118 instantiations were placed in corresponding nodes 102 based on respective VNF placement requests, which indicate/reference VNF identifiers and/or VNF descriptors for respective VNF 118 instantiations. At operation 302, the placement services 114 determine identifiers and descriptors for these VNF 118 instantiations. FIG. 4 shows an example component diagram of the placement services 114 according to one embodiment. As shown in FIG. 4, the placement services 114 may include a current VNF determiner 402, which may be used at operation 302 for determining VNF identifiers 422 and VNF descriptors 424 for all currently placed VNF 118 instantiations in the datacenter system 100.

At operation 304, the placement services 114 determine infrastructure information 206 in the datacenter system 100 for each VNF 118 instantiation. As noted above, the infrastructure information 206 can include, for example, (1) utilized resources 206A of a VNF 118 instantiation (e.g., resources 110 assigned/allocated to a VNF 118 instantiation during placement that is being utilized by the VNF 118 instantiation for execution), (2) non-utilized resources 206B (e.g., resources 110 assigned/allocated to a VNF 118 instantiation during placement that are not being utilized by the VNF 118 instantiation), (3) geographic information 206C associated with resources 110 (e.g., a geographic location of resources 110 that have been assigned/allocated to a VNF 118 instantiation), (4) key performance indicators (KPIs) 206D, which describe the processing of the instantiated VNF 118 using the assigned resources 110 (e.g., a bandwidth indication, a load indication, etc.), and/or (5) a timestamp 206E, which describes when the infrastructure information 206 was determined or stored. As shown in FIG. 4, the placement services 114 may include an infrastructure information determiner 404, which may be used at operation 304 for determining infrastructure information 206 for all currently placed VNF 118 instantiations in the datacenter system 100.

At operation 306, the placement services 114 may summarize the infrastructure information 206. For example, the placement services 114 may filter the originally determined infrastructure information 206 to only include entries for periods of time with maximized KPIs 206D. As shown in FIG. 4, the placement services 114 may include an infrastructure information summarizer 406, which may be used at operation 306 for summarizing infrastructure information 206 for all currently placed instantiations of VNFs 118 in the datacenter system 100.

At operation 308, the placement services 114 may store the infrastructure information 206, which was possibly filtered/summarized at operation 306, along with the corresponding VNF identifiers 422 and VNF descriptors 424 as historical data 200. As shown in FIG. 4, the placement services 114 may include a historical data repository 408, which may be used at operation 308 for storing the historical data 200.

At operation 310, the placement services 114 may receive a VNF placement request 426 for placement of an instantiation of a VNF 118 in the datacenter system 100. The VNF placement request 426 may be received from a placement request agent 112 of a client device 108 and may include a VNF identifier 422 of a VNF 118 to be placed/instantiated in the datacenter system 100 and a VNF descriptor 424 of the VNF 118. In particular, the client device 108 may determine to instantiate a VNF 118 for performance of some service/application. Accordingly, the placement request agent 112 of the client device 108 may generate and transmit a VNF placement request to the datacenter system 100 that is received/processed by the placement services 114. The VNF descriptor 424 of the VNF placement request describes a set of constraints for placing the VNF 118 instantiation. For example, the constraints may be processing constraints (e.g., a number of processors/cores and an amount of memory to be used for executing the VNF 118 instantiation) and/or geographical constraints (e.g., assigned resources 110 must be located in a particular geographical region/location). As shown in FIG. 4, the placement services 114 may include a VNF placement request receiver 410, which may be used at operation 310 for receiving a VNF placement request 426.

At operation 312, in response to receipt of the VNF placement request 426, the placement services 114 may retrieve historical data 200 corresponding to the VNF 118 identified in the VNF placement request 426. In particular, the placement services 114 may query the historical data 200 using the VNF identifier 422 included in the VNF placement request 426 to return corresponding historical data 200 (sometimes referred to as "VNF historical data 200"). Accordingly, the retrieved historical data 200 corresponds to the VNF 118 that has been requested to be placed in the datacenter system 100 at operation 310. As shown in FIG. 4, the placement services 114 may include a VNF historical data retriever 412, which may be used at operation 312 for receiving historical data 200 corresponding to the VNF 118 identified in the VNF placement request 426.

In one embodiment, the historical data 200 may not include data for the VNF 118 indicated in the VNF placement request 426 (i.e., the historical data 200 does not include infrastructure information 206 corresponding to the VNF identifier 422 of the VNF placement request 426). In this embodiment, the placement services 114 may determine VNFs 118 and corresponding historical data 200 that is similar to the VNF 118 indicated in the VNF placement request 426 based on the VNF descriptor 424 in the VNF placement request 426 (i.e., the VNF descriptor 424 is compared against utilized resources 206A and, optionally, non-utilized resources 206B of the infrastructure information 206 to determine similarity). These similar pieces of historical data 200 may then be retrieved at operation 312.

At operation 314, the placement services 114 retrieve current infrastructure information for a set of candidate nodes 102 in the datacenter system 100. The current infrastructure information can include currently available resources 110 for a set of candidate nodes 102 (e.g., currently available processors/cores, memory, etc.). As shown in FIG. 4, the placement services 114 may include a current infrastructure information determiner 414, which may be used at operation 314 for retrieving current infrastructure information 428 for a set of candidate nodes 102 in the datacenter system 100. In comparison to the infrastructure information 206, which is generated per currently placed VNF 118 instantiations, the current infrastructure information 428 describes availability or unavailability of resources 110 of candidate nodes 102 in the datacenter system 100.

At operation 316, the placement services 114 may filter the candidate nodes 102 based on the current infrastructure information 428 and the VNF descriptor 424, which was included in the VNF placement request 426 received at operation 310. In particular, candidate nodes 102 are removed from the set of candidate nodes 102 based on their inability to fulfill the constraints of the VNF descriptor 424. For example, if the VNF descriptor 424 indicates a particular set of resource constraints that the placement services 114 determine a node 102 cannot fulfill based on the current infrastructure information 428, the placement services 114 filter/remove this node 102 from the set of candidate nodes 102. As shown in FIG. 4, the placement services 114 may include a candidate node filter 416, which may be used at operation 316 for filtering the candidate nodes 102 based on the current infrastructure information 428 and the VNF descriptor 424.

At operation 318, the placement services 114 calculate similarity values for each candidate node 102 based on the current infrastructure information 428 and the historical data 200. For example, the similarity values can be based on a Pearson correlation, Euclidean distance, fractional distance, Manhattan distance, cosine distance, etc. As shown in FIG. 4, the placement services 114 may include a similarity calculator 418, which may be used at operation 318 for calculating similarity values 430 (sometimes referred to as a rating value 430) for each candidate node 102 based on the current infrastructure information 428 and the VNF historical data 200.

At operation 320, the placement services 114 determine a placement node for fulfilling the VNF placement request 426 based on the similarity values 430 for each candidate node 102. For example, at sub-operation 320A the placement services 114 can determine norm values for the VNF 118 and node 102 pairs based on the product of the similarity value 430 for the node 102 and a KPI 206D provided by the historical data 200 (e.g., a placement decision can be drawn from the maximum of the product between the similarity value 430 and each of the historical KPIs 206D, which gives the maximum norm value per VNF 118 and node 102 pair in which the norm value is the norm of a vector). In another example, at sub-operation 320B the placement services 114 can input the similarity values 430 for the candidate nodes 102 into a cost function along with KPIs 206D and optionally one or more other input values to arrive at a placement decision for placement of the VNF 118. This cost function can contain any parameters, including, for example, monetary gain/loss for fulfillment/non-fulfillment of a given KPI 206D. In some embodiments, the cost function may consider an exploitation vs. exploration strategy such that the cost function can explore some placement decisions that do not fulfill the VNF descriptor 424 constraints and therefore execute a check on the validity/value of the constraints of the VNF descriptor 424. Accordingly, the placement services 114 can find a successful placement using fewer resources 110 than declared in the VNF descriptor 424 and, consequently, find greedy VNF descriptors 424 that can be relaxed according to the historical data 200. As shown in FIG. 4, the placement services 114 may include a placement determiner 420 (sometimes referred to as an optimizer 420), which may be used at operation 320 for determining a placement node 432 for fulfilling the VNF placement request 426 based on the similarity values 430 for each candidate node 102.

As described, the placement decision for a VNF placement request is based on the historical data 200 of previous VNF 118 placements. The benefits of placement recommendations based on historical data 200 include simplification and efficiency of placement decisions since nodes 102 with better ratings will be prioritized, resulting in a reduced number of nodes 102 as effective candidates for the placement. Further, problems detected in past placement decisions are avoided for subsequent placement decisions (e.g., previous placements that generated performance degradation can be identified with machine learning based schemes, such as anomaly detection). Additionally, by using historical data 200 for automated placement decisions, VNF 118 constraints/descriptors are no longer the only input, such that the placement services 114 can provide the most relevant nodes 102 for the placement based on previous decisions. This consequently provides the benefit of decreasing the dependency on resource descriptors for placement since historical data 200 is used, while traditional optimization-based solutions will always need service requirements/descriptors as inputs. As a result, the roles of models (e.g., VNF descriptors or network service descriptors (NSDs)) in placement are less important since service parameters and requirements can be inferred from the historical data 200. The technical effect is that, when a VNF placement is requested, historical data 200 will be used to obtain or infer the actual VNF requirements/descriptors. Thus, the requirements declared in the VNF descriptors that are provided in the VNF placement request will not be used, while providing a more accurate placement solution.

Figure 5A:
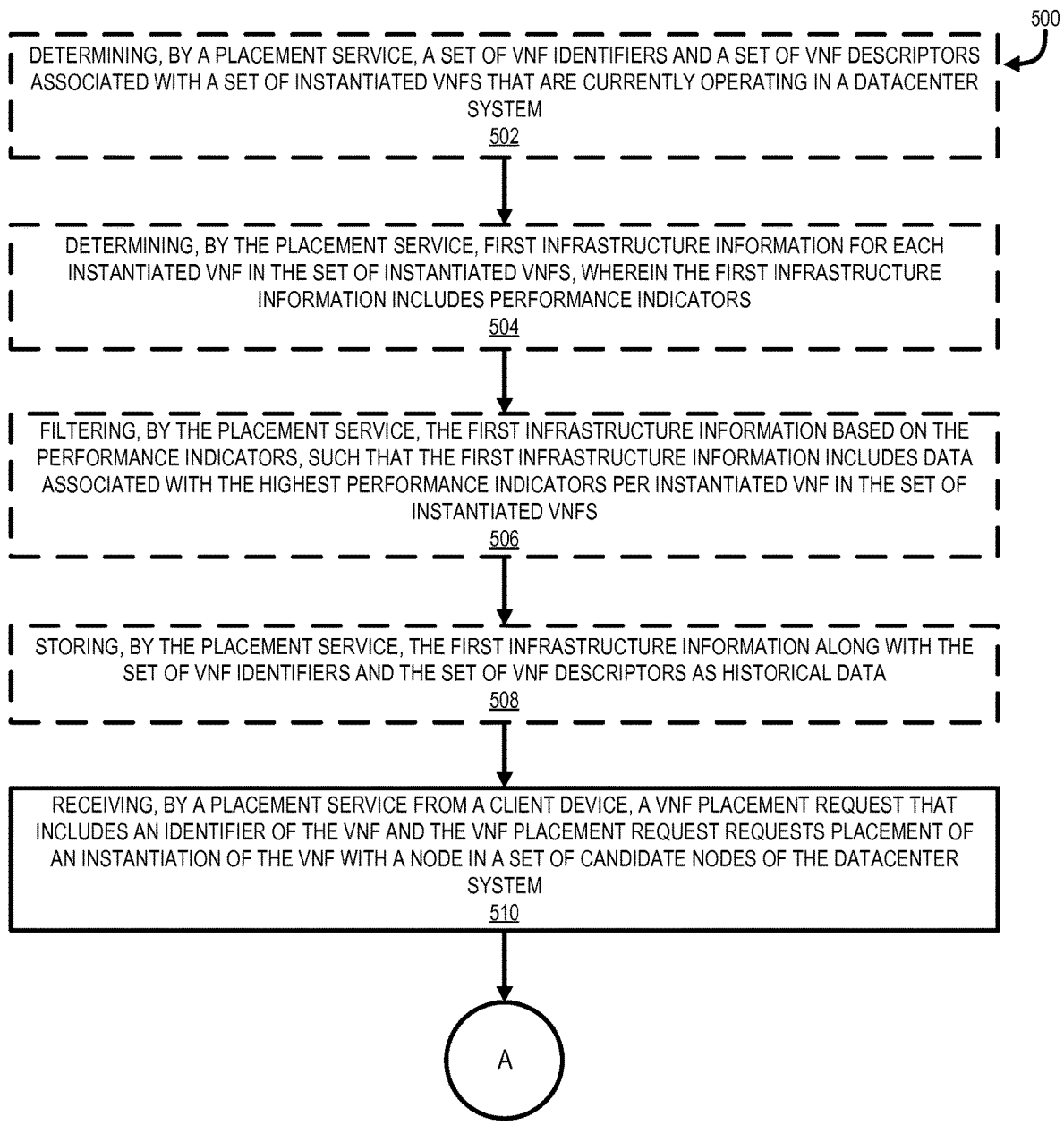
FIGS. 5A and 5B illustrate a method for determining a placement decision based on historical data of previous placement decisions, according to one example embodiment.
Figure 5B:
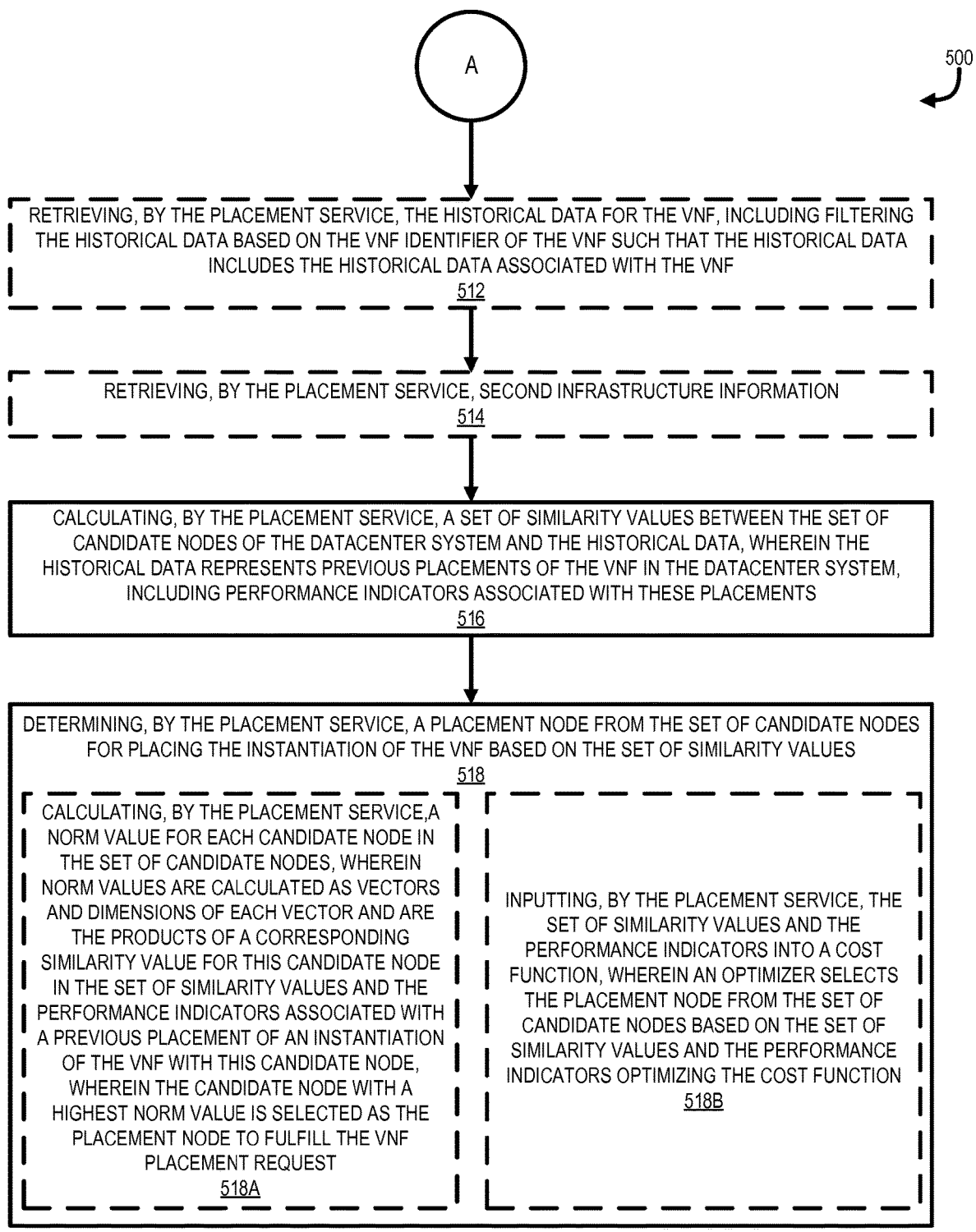

FIGS. 5A and 5B illustrate a method 500 for determining a placement decision based on historical data 200 of previous placement decisions, according to one example embodiment. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

As shown in FIG. 5A, the method 500 may commence at operation 502 with a placement service 114 determining a set of VNF identifiers 422 and a set of VNF descriptors 424 associated with a set of instantiated VNFs 118 that are currently operating in a datacenter system 100. In particular, each of the nodes 102 in the datacenter system 100 may be using corresponding resources 110 for processing/executing one or more VNF 118 instantiations. Each of the VNF 118 instantiations were placed in corresponding nodes 102 based on respective VNF placement requests 426, which indicate/reference VNF identifiers 422 and/or VNF descriptors 424 for respective VNF 118 instantiations.

At operation 504, the placement service 114 determines first infrastructure information for each instantiated VNF 118 in the set of instantiated VNFs 118. As noted above, infrastructure information 206 can include, for example, (1) utilized resources 206A of a VNF 118 instantiation (e.g., resources 110 assigned/allocated to a VNF 118 instantiation during placement that is being utilized by the VNF 118 instantiation for execution), (2) non-utilized resources 206B (e.g., resources 110 assigned/allocated to a VNF 118 instantiation during placement that are not being utilized by the VNF 118 instantiation), (3) geographic information 206C associated with resources 110 (e.g., a geographic location of resources 110 that have been assigned/allocated to a VNF 118 instantiation), (4) key performance indicators (KPIs) 206D (performance indicators 206D), which describe the processing of the instantiated VNF 118 using the assigned resources 110 (e.g., a bandwidth indication, a load indication, etc.), and/or (5) a timestamp 206E, which describes when the infrastructure information 206 was determined or stored.

At operation 506, the placement service 114 summarizes/filters the first infrastructure information based on the performance indicators/KPIs 206D, such that the first infrastructure information includes data associated with the highest performance indicators/KPIs 206D per instantiated VNF 118 in the set of instantiated VNFs 118. For example, the placement services 114 may filter the first infrastructure information to only include entries for periods of time with maximized performance indicators/KPIs 206D.

At operation 508, the placement service 114 stores the first infrastructure information along with the set of VNF identifiers 422 and the set of VNF descriptors 424 as historical data 200.

At operation 510, the placement service 114 receives from a client device 108, a VNF placement request 426 that includes an identifier of the VNF 118 and the VNF placement request 426 requests placement of an instantiation of the VNF 118 with a node 102 in a set of candidate nodes of the datacenter system 100. The VNF placement request 426 may be received from a placement request agent 112 of a client device 108. In particular, the client device 108 may determine to instantiate a VNF 118 for performance of some service/application. Accordingly, the placement request agent 112 of the client device 108 may generate and transmit a VNF placement request 426 to the datacenter system 100 that is received/processed by the placement service 114.

At operation 512, the placement service 114 retrieves the historical data 200 for the VNF 118, including filtering the historical data 200 based on the VNF identifier of the VNF 118 such that the historical data 200 includes the historical data 200 associated with the VNF 118. In particular, the placement service 114 may query the historical data 200 using the VNF identifier 422 included in the VNF placement request 426 to return corresponding historical data 200. Accordingly, the retrieved historical data 200 corresponds to the VNF 118 that has been requested to be placed in the datacenter system 100. When the historical data 200 does not include the VNF identifier 422 of the VNF 118, the method 500 further comprises filtering the historical data 200 based on the VNF descriptor 424 of the VNF placement request 426 such that the historical data 200 includes data that is similar to constraints of the VNF descriptor 424.

At operation 514, the placement service 114 retrieves second infrastructure information. The second infrastructure information may correspond to current infrastructure information 428 for a set of candidate nodes 102 in the datacenter system 100 and as such can include currently available resources 110 for a set of candidate nodes 102 (e.g., currently available processors/cores, memory, etc.).

At operation 516, the placement service 114 calculates a set of similarity values 430 between the set of candidate nodes 102 of the datacenter system 100 and the historical data 200. As noted above, the historical data 200 represents previous placements of the VNF 118 in the datacenter system 100, including performance indicators/KPIs 206D associated with these placements. For example, the similarity values 430 can be based on a Pearson correlation, Euclidean distance, fractional distance, Manhattan distance, cosine distance, etc.

At operation 518, the placement service 114 determines a placement node 102 from the set of candidate nodes 102 for placing the instantiation of the VNF 118 based on the set of similarity values 430. For example, at sub-operation 518A, the placement service 114 calculates a norm value for each candidate node 102 in the set of candidate nodes 102. Norm values are calculated as vectors and dimensions of each vector are the products of a corresponding similarity value 430 for this candidate node 102 in the set of similarity values 430 and the performance indicators/KPIs 206D associated with a previous placement of an instantiation of the VNF 118 with this candidate node 102. The candidate node 102 with a highest norm value is selected as the placement node 102 to fulfill the VNF placement request 426. In another example, at sub-operation 518B the placement service 114 inputs the set of similarity values 430 and the performance indicators/KPIs 206D into a cost function, wherein an optimizer/placement determiner 420 selects the placement node 102 from the set of candidate nodes 102 based on the set of similarity values 430 and the performance indicators/KPIs 206D to optimize the cost function. In some embodiments, the VNF placement request 426 includes a VNF descriptor 424, which indicates a set of constraints from the client device 108 for placement of the instantiation of the VNF 118 and the cost function selects the placement node 102 without fulfilling a constraint in the set of constraints.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application—specific integrated—circuits (ASICs) and a special-purpose operating system (OS); and 2) a general purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and physical NIs 646, as well as non-transitory machine readable storage media 648 having stored therein software 650 and/or placement services 114. During operation, the processor(s) 642 execute the software 650 and/or placement services 114 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 6C:
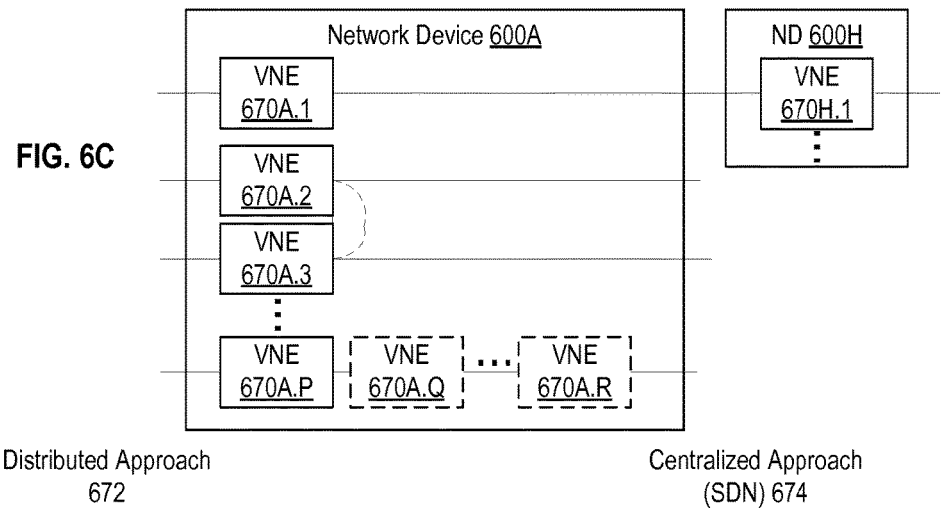
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 6D:
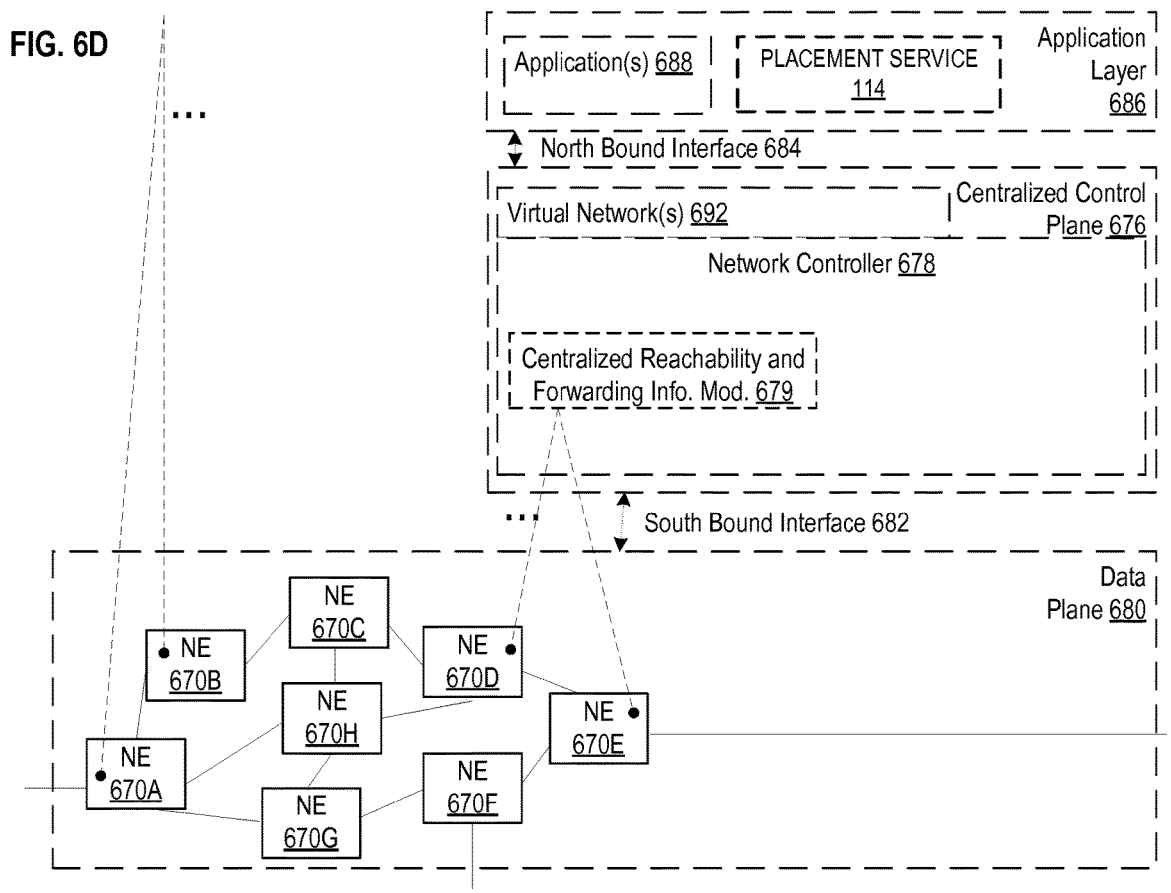
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to as the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688 and/or placement services 114. The centralized control plane 676 has the ability to form virtual networks 692 (sometimes referred to as a logical forwarding plane, network services, or overlay networks (with the NEs 670A-H of the data plane 680 being the underlay network)) for the application(s) 688 and/or placement services 114. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
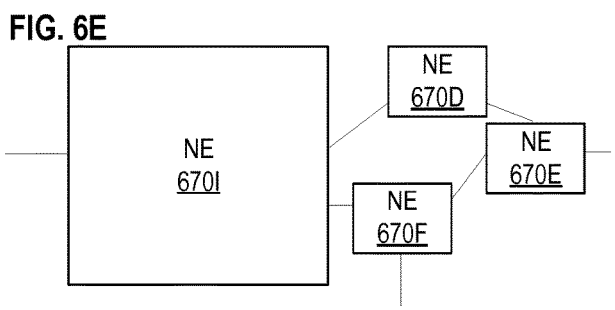
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
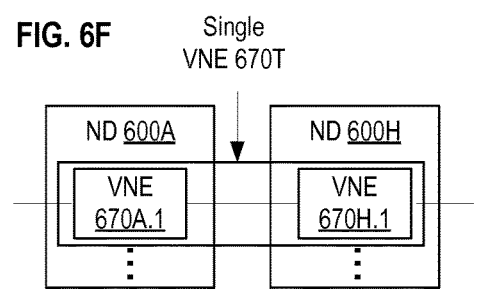
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
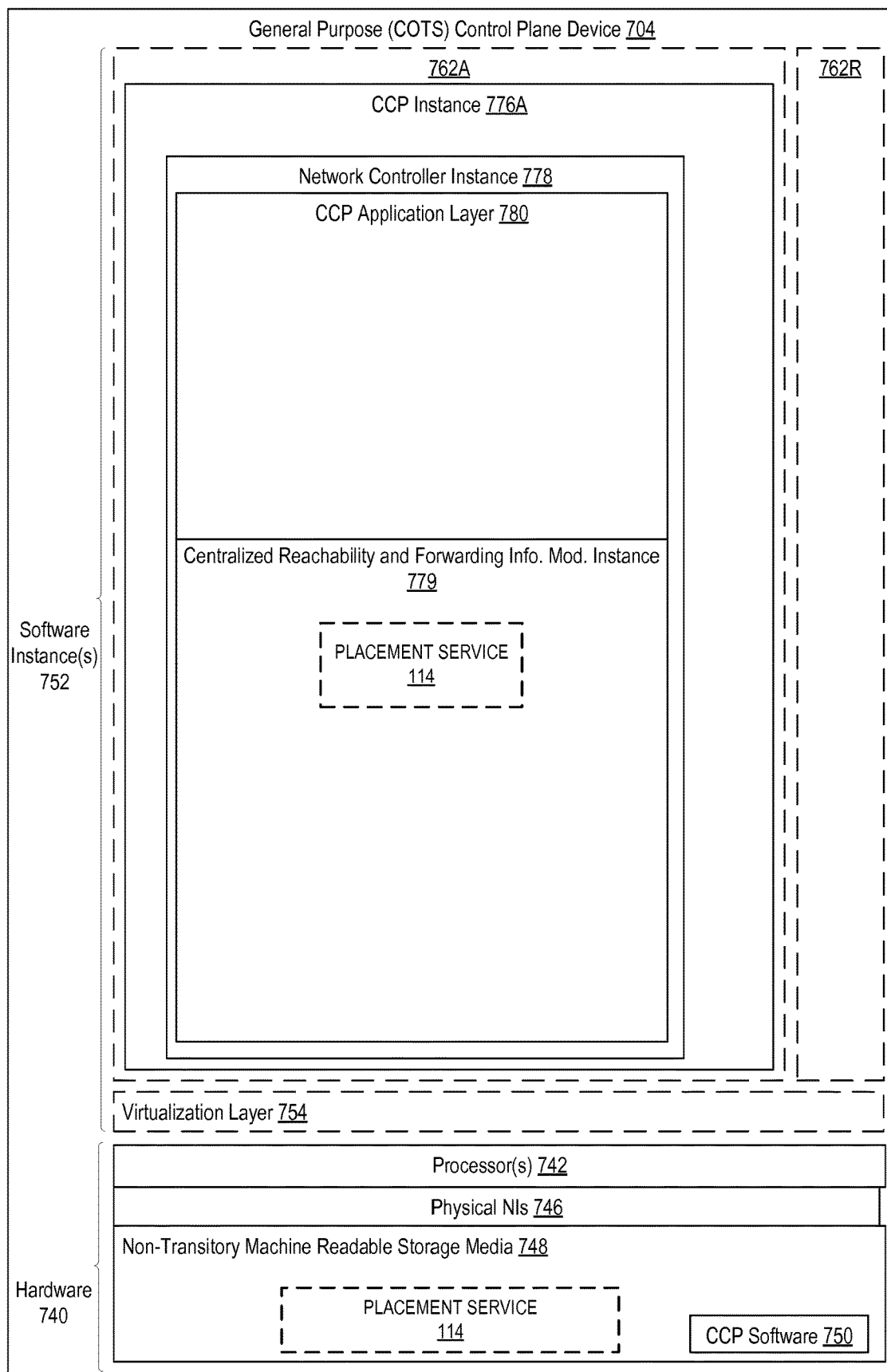
FIG. 7 illustrates a general purpose control plane device with centralized control plane (CCP) software, according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and physical NIs 746, as well as non-transitory machine readable storage media 748 having stored therein centralized control plane (CCP) software 750 and/or placement services 114.

In embodiments that use compute virtualization, the processor(s) 742 typically execute software to instantiate a virtualization layer 754 (e.g., in one embodiment the virtualization layer 754 represents the kernel of an operating system (or a shim executing on a base operating system) that allows for the creation of multiple instances 762A-R called software containers (representing separate user spaces and also called virtualization engines, virtual private servers, or jails) that may each be used to execute a set of one or more applications; in another embodiment the virtualization layer 754 represents a hypervisor (sometimes referred to as a virtual machine monitor (VMM)) or a hypervisor executing on top of a host operating system, and an application is run on top of a guest operating system within an instance 762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 740, directly on a hypervisor represented by virtualization layer 754 (in which case the unikernel is sometimes described as running within a LibOS virtual machine), or in a software container represented by one of instances 762A-R). Again, in embodiments where compute virtualization is used, during operation an instance of the CCP software 750 (illustrated as CCP instance 776A) is executed (e.g., within the instance 762A) on the virtualization layer 754. In embodiments where compute virtualization is not used, the CCP instance 776A is executed, as a unikernel or on top of a host operating system, on the "bare metal" general purpose control plane device 704. The instantiation of the CCP instance 776A, as well as the virtualization layer 754 and instances 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs and for processing placement services 114), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for placing a virtual network function (VNF) in a datacenter system based on historical data, the method comprising:

receiving, by a placement service from a client device, a VNF placement request that includes an identifier of the VNF, wherein the VNF placement request requests placement of an instantiation of the VNF with a node in a set of candidate nodes of the datacenter system;

calculating, by the placement service, a set of similarity values between the set of candidate nodes of the datacenter system and the historical data, the historical data representing previous placements of the VNF in the datacenter system, including performance indicators associated with these placements; and determining, by the placement service, a placement node from the set of candidate nodes for placing the instantiation of the VNF based on the set of similarity values.

2. The method of claim 1, wherein the historical data further includes one or more of utilized resources, which were allocated and used by previous instantiations of the VNF, non-utilized resources, which were allocated but not used by the previous instantiations of the VNF, and geographical information describing locations of each of the candidates nodes in the set of candidate nodes.

3. The method of claim 1, wherein determining the placement node comprises:

calculating, by the placement service, a norm value for each candidate node in the set of candidate nodes, wherein norm values are calculated as vectors and dimensions of each vector are the products of a corresponding similarity value for this candidate node in the set of similarity values and the performance indicators associated with a previous placement of an instantiation of the VNF with this candidate node; and wherein the candidate node with a highest norm value is selected as the placement node to fulfill the VNF placement request.

4. The method of claim 1, wherein determining the placement node comprises:

inputting, by the placement service, the set of similarity values and the performance indicators into a cost function, wherein an optimizer selects the placement node from the set of candidate nodes based on the set of similarity values and the performance indicators to optimize the cost function.

5. The method of claim 4, wherein the VNF placement request includes a VNF descriptor, which indicates a set of constraints from the client device for placement of the instantiation of the VNF; and wherein the cost function selects the placement node without fulfilling a constraint in the set of constraints.

6. The method of claim 1, further comprising:

determining, by the placement service, a set of VNF identifiers and a set of VNF descriptors associated with a set of instantiated VNFs that are currently operating in the datacenter system;

determining, by the placement service, first infrastructure information for each instantiated VNF in the set of instantiated VNFs, wherein the first infrastructure information includes the performance indicators;

filtering, by the placement service, the first infrastructure information based on the performance indicators, such that the first infrastructure information includes data associated with the highest performance indicators per instantiated VNF in the set of instantiated VNFs; and storing, by the placement service, the first infrastructure information along with the set of VNF identifiers and the set of VNF descriptors as the historical data.

7. The method of claim 6, further comprising:

retrieving, by the placement service, the historical data for the VNF, including filtering the historical data based on the VNF identifier of the VNF such that the historical data includes the historical data associated with the VNF;

retrieving, by the placement service, second infrastructure information;

wherein calculating the set of similarity values is based on the second infrastructure information of the set of candidate nodes and the historical data associated with the VNF; and wherein the first infrastructure information is taken at a first point in time and the second infrastructure information is taken at a later point in time.

8. The method of claim 7, wherein when the historical data does not include the VNF identifier of the VNF, the method further comprises filtering the historical data based on the VNF descriptor of the VNF placement request such that the historical data includes data that is similar to constraints of the VNF descriptor.

9. A non-transitory machine-readable storage medium storing executable program instructions that, if executed by a processor of a placement service in a datacenter system, cause the processor to perform operations comprising:

receiving, from a client device, a VNF placement request that includes an identifier of the VNF, wherein the VNF placement request requests placement of an instantiation of the VNF with a node in a set of candidate nodes of the datacenter system;

calculating a set of similarity values between the set of candidate nodes of the datacenter system and historical data, the historical data representing previous placements of the VNF in the datacenter system, including performance indicators associated with these placements; and determining a placement node from the set of candidate nodes for placing the instantiation of the VNF based on the set of similarity values.

10. The non-transitory machine-readable storage medium of claim 9, wherein the historical data further includes one or more of utilized resources, which were allocated and used by previous instantiations of the VNF, non-utilized resources, which were allocated but not used by the previous instantiations of the VNF, and geographical information describing locations of each of the candidates nodes in the set of candidate nodes.

11. The non-transitory machine-readable storage medium of claim 9, wherein determining the placement node comprises:

calculating a norm value for each candidate node in the set of candidate nodes, wherein norm values are calculated as vectors and dimensions of each vector are the products of a corresponding similarity value for this candidate node in the set of similarity values and the performance indicators associated with a previous placement of an instantiation of the VNF with this candidate node; and wherein the candidate node with a highest norm value is selected as the placement node to fulfill the VNF placement request.

12. The non-transitory machine-readable storage medium of claim 9, wherein determining the placement node comprises:

inputting the set of similarity values and the performance indicators into a cost function, wherein an optimizer selects the placement node from the set of candidate nodes based on the set of similarity values and the performance indicators to optimize the cost function.

13. The non-transitory machine-readable storage medium of claim 12, wherein the VNF placement request includes a VNF descriptor, which indicates a set of constraints from the client device for placement of the instantiation of the VNF; and wherein the cost function selects the placement node without fulfilling a constraint in the set of constraints.

14. The non-transitory machine-readable storage medium of claim 9, wherein the operations further comprise:
   determining a set of VNF identifiers and a set of VNF descriptors associated with a set of instantiated VNFs that are currently operating in the datacenter system;
   determining first infrastructure information for each instantiated VNF in the set of instantiated VNFs, wherein the first infrastructure information includes the performance indicators;
   filtering the first infrastructure information based on the performance indicators, such that the first infrastructure information includes data associated with the highest performance indicators per instantiated VNF in the set of instantiated VNFs; and
   storing the first infrastructure information along with the set of VNF identifiers and the set of VNF descriptors as the historical data.

15. The non-transitory machine-readable storage medium of claim 14, wherein the operations further comprise:
   retrieving the historical data for the VNF, including filtering the historical data based on the VNF identifier of the VNF such that the historical data includes the historical data associated with the VNF;
   retrieving second infrastructure information;
   wherein calculating the set of similarity values is based on the second infrastructure information of the set of candidate nodes and the historical data associated with the VNF; and
   wherein the first infrastructure information is taken at a first point in time and the second infrastructure information is taken at a later point in time.

16. The non-transitory machine-readable storage medium of claim 15, wherein when the historical data does not include the VNF identifier of the VNF, the operations further comprise filtering the historical data based on the VNF descriptor of the VNF placement request such that the historical data includes data that is similar to constraints of the VNF descriptor.

17. A system for placement of a virtual network function (VNF) in a distributed datacenter, the system comprising:
   a memory unit that stores instructions; and
   a processor coupled to the memory unit to execute the instructions, the instructions causing the system to:
   receive, from a client device, a VNF placement request that includes an identifier of the VNF, wherein the VNF placement request requests placement of an instantiation of the VNF with a node in a set of candidate nodes of the datacenter system;
   calculate a set of similarity values between the set of candidate nodes of the datacenter system and historical data, the historical data representing previous placements of the VNF in the datacenter system, including performance indicators associated with these placements; and
   determine a placement node from the set of candidate nodes for placing the instantiation of the VNF based on the set of similarity values.

18. The system of claim 17, wherein determining the placement node comprises:
   calculating a norm value for each candidate node in the set of candidate nodes, wherein norm values are calculated as vectors and dimensions of each vector are the products of a corresponding similarity value for this candidate node in the set of similarity values and the performance indicators associated with a previous placement of an instantiation of the VNF with this candidate node; and
   wherein the candidate node with a highest norm value is selected as the placement node to fulfill the VNF placement request.

19. The system of claim 17, wherein determining the placement node comprises:
   inputting the set of similarity values and the performance indicators into a cost function, wherein an optimizer selects the placement node from the set of candidate nodes based on the set of similarity values and the performance indicators to optimize the cost function.

20. The system of claim 19, wherein the VNF placement request includes a VNF descriptor, which indicates a set of constraints from the client device for placement of the instantiation of the VNF; and
   wherein the cost function selects the placement node without fulfilling a constraint in the set of constraints.

* * * * *